(12) United States Patent
Shindo et al.

(10) Patent No.: US 12,122,004 B2
(45) Date of Patent: Oct. 22, 2024

(54) MACHINE TOOL

(71) Applicant: NAGASE INTEGREX CO., LTD., Seki (JP)

(72) Inventors: Ryota Shindo, Seki (JP); Keiji Uemura, Seki (JP)

(73) Assignee: NAGASE INTEGREX CO., LTD., Seki (JP)

( * ) Notice: Subject to any disclaimer, the term of this patent is extended or adjusted under 35 U.S.C. 154(b) by 220 days.

(21) Appl. No.: 17/775,703

(22) PCT Filed: Nov. 20, 2020

(86) PCT No.: PCT/JP2020/043405
§ 371 (c)(1),
(2) Date: May 10, 2022

(87) PCT Pub. No.: WO2021/100857
PCT Pub. Date: May 27, 2021

(65) Prior Publication Data
US 2022/0395945 A1    Dec. 15, 2022

(30) Foreign Application Priority Data
Nov. 22, 2019 (JP) ................................. 2019-211048

(51) Int. Cl.
*B23Q 1/01* (2006.01)
*B23Q 1/26* (2006.01)

(52) U.S. Cl.
CPC ............... *B23Q 1/26* (2013.01); *B23Q 1/015* (2013.01); *B23Q 1/017* (2013.01)

(58) Field of Classification Search
CPC .. B23Q 1/01–017; B23Q 1/48; B23Q 1/4804; B23Q 1/4828; B23Q 1/4852; B23Q 1/64; B23Q 1/38–385; B23Q 37/005
See application file for complete search history.

(56) References Cited

U.S. PATENT DOCUMENTS 8,887,361 B2 *  11/2014  Yu ........................... B23Q 5/40
                                                        82/122
2004/0045146 A1 *  3/2004  Studemann ........ B23Q 11/0825
                                                        29/27 C (Continued)

FOREIGN PATENT DOCUMENTS

EP    1 588 796 A2    10/2005
JP    H1199424 A  *    4/1999

(Continued)

OTHER PUBLICATIONS

European Search Report, Date: Feb. 21, 2024, Application No. 20890177.7 of the Extended European Search Report.
European Search Report, Date: Feb. 21, 2024.

*Primary Examiner* — Tyrone V Hall, Jr.
(74) *Attorney, Agent, or Firm* — Grogan, Tuccillo & Vanderleeden LLP (57) ABSTRACT

A machine tool includes a rotation table unit including a rotation table configured to rotate with respect to a first axis. The rotation table unit is configured to move along a second axis that is orthogonal to the first axis. The machine tool includes a spindle unit including a spindle configured to rotate with respect to a third axis that is orthogonal to the first axis and the second axis. The spindle unit is configured to move along the third axis. The machine tool includes a bed that supports the rotation table unit and the spindle unit. A front part of an upper surface of the bed includes a recess in which the rotation table unit is arranged. The spindle unit is located at a rear part of the upper surface of the bed.

15 Claims, 10 Drawing Sheets

(56) References Cited

U.S. PATENT DOCUMENTS

2005/0034289 A1  2/2005  Hosoe
2005/0236910 A1  10/2005  Botos
2015/0128773 A1  5/2015  Schneider

FOREIGN PATENT DOCUMENTS

| JP | H11300556 A | 11/1999 |
| JP | 2005088125 A | 4/2005 |
| JP | 20050888125 A | 4/2005 |
| JP | 2006102903 A | 4/2006 |
| JP | 2006167823 A | 6/2006 |
| JP | 2007266585 A | 10/2007 |
| JP | 2009233805 A | 10/2009 |
| JP | 2011240484 A | 12/2011 |
| JP | 2012045681 A | 3/2012 |
| WO | 2014/086621 A1 | 6/2014 |

\* cited by examiner

MACHINE TOOL

TECHNICAL FIELD

The present disclosure relates to a machine tool used to machine a workpiece that is supported by a spindle unit.

BACKGROUND ART

Patent Literature 1 discloses a machine tool that includes a workpiece rotation apparatus and a tool holder. The workpiece rotation apparatus includes a circular table. The tool holder is spaced upward from the workpiece rotation apparatus. Patent Literature 1 does not disclose a detailed structure of the table of the workpiece rotation apparatus.

Patent Literature 2 discloses a machine tool that includes a column with a spindle that extends in a horizontal surface. The column is movably supported in the extending direction of the spindle. The column is moved by the rotation of a lead screw extending in the same direction as the spindle. The lead screw is located at a lower part of the column and on an upper surface of a bed.

CITATION LIST

Patent Literature

Patent Literature 1: Japanese Laid-Open Patent Publication No. 2012-45681

Patent Literature 2: Japanese Laid-Open Patent Publication No. 2011-240484

SUMMARY OF INVENTION

Problems that the Invention is to Solve

In the machine tool of Patent Literature 1, the tool holder downwardly holds a tool. This unavoidably increases the height of the entire machine tool of Patent Literature 1 and enlarges the machine tool. The enlargement of the machine tool increases the weight of the machine tool. Thus, the machine tool is installed in a factory under limited conditions. In a case where the machine tool is increased in size and weight, the natural frequency of the machine decreases while the amplitude of natural vibration increases. This lowers the machining accuracy.

In the machine tool of Patent Literature 2, the lead screw that moves the column is located below the spindle. Thus, the lead screw is located below the center of gravity of the column, and a movement driving force produced by the lead screw acts on the column as a moment that inclines the spindle. Particularly, the occurrence of an accuracy error occurs in the pitch or the like of the lead screw may potentially lower a movement accuracy of the column and incline the column. As a result, the machining accuracy decreases.

It is an objective of the present disclosure to provide a machine tool in which the accuracy of machining is improved.

Solution to Problem

A machine tool according to an aspect of the present disclosure includes a rotation table unit including a rotation table configured to rotate with respect to a first axis. The rotation table unit is configured to move along a second axis that is orthogonal to the first axis. The machine tool includes a spindle unit including a spindle configured to rotate with respect to a third axis that is orthogonal to the first axis and the second axis. The spindle unit is configured to move along the third axis. The machine tool includes a bed that supports the rotation table unit and the spindle unit. A front part of an upper surface of the bed includes a recess in which the rotation table unit is arranged. The spindle unit is located at a rear part of the upper surface of the bed.

A machine tool according to another aspect of the present disclosure includes a spindle unit including a spindle configured to rotate with respect to a horizontal axis. The spindle unit is configured to move along the axis. The machine tool includes linear motors respectively arranged on opposite sides of the spindle unit. The linear motors are configured to move the spindle unit along the axis.

A machine tool according to a further aspect of the present disclosure includes a rotation table unit including a rotation table configured to rotate with respect to a first axis. The rotation table unit is configured to move along a second axis that is orthogonal to the first axis. The machine tool includes a spindle unit including a spindle configured to rotate with respect to a third axis that is orthogonal to the first axis and the second axis. The spindle unit is configured to move along the third axis. The machine tool includes linear motors respectively arranged on opposite sides of the spindle unit. The linear motors are configured to move the spindle unit along the third axis. A center of gravity of the spindle unit is located in a range of a thickness of each of the linear motors in an up-down direction of the linear motors.

DESCRIPTION OF EMBODIMENTS

Embodiment

A machine tool according to an embodiment will now be described. The machine tool of the present embodiment is a lathe.

Figure 1:
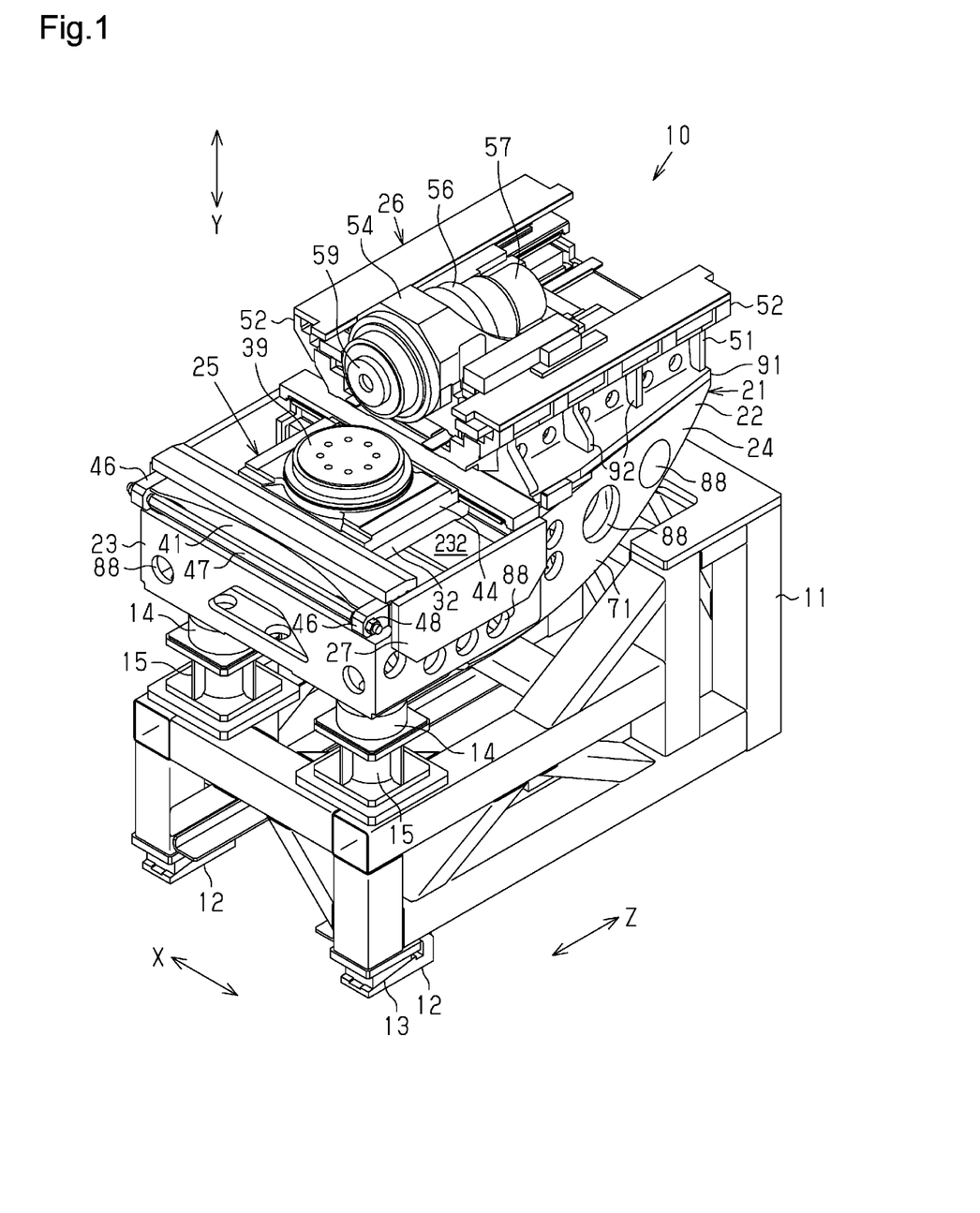
FIG. 1 is a perspective view of a lathe unit seen from a diagonally upper front side.
Figure 2:
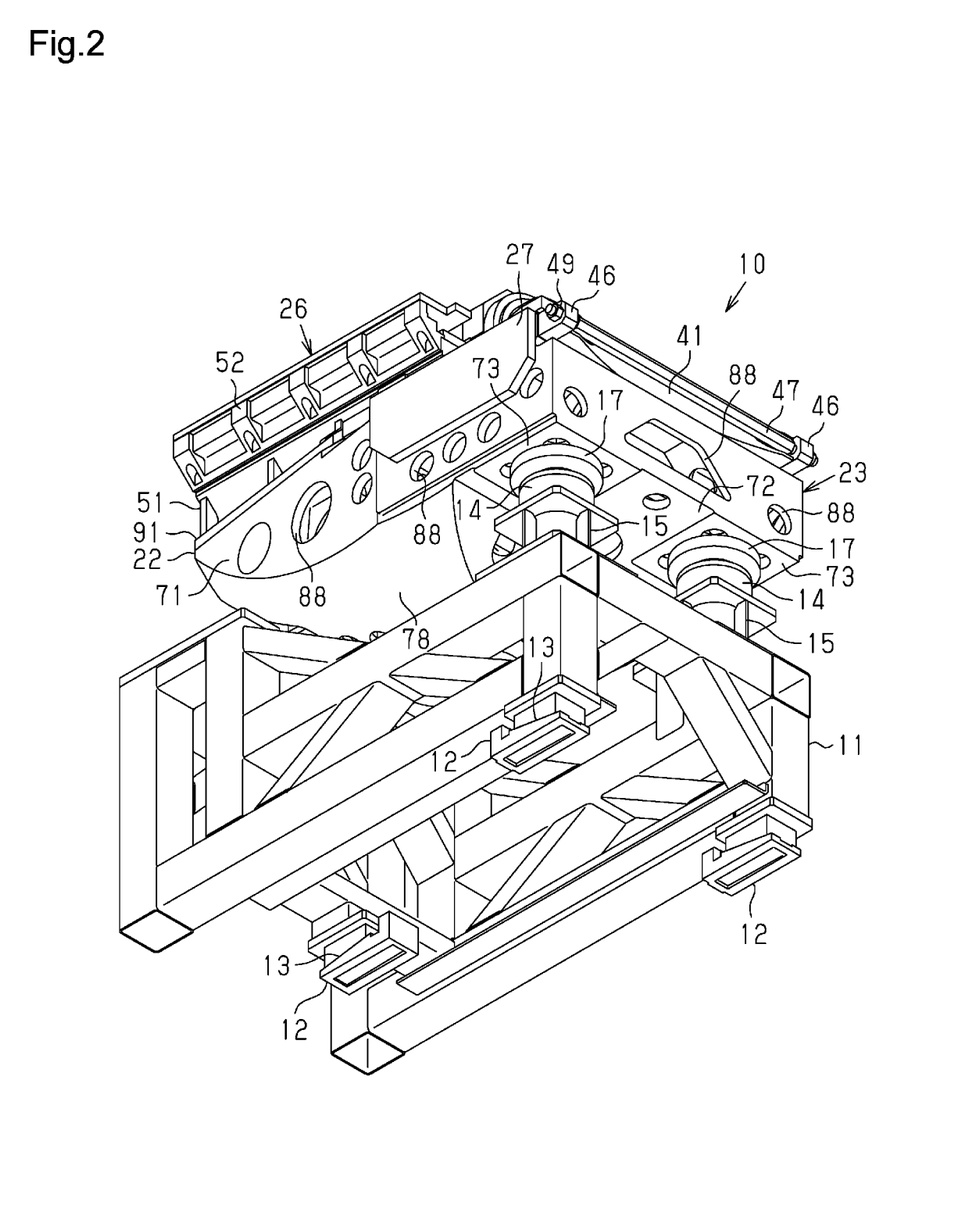
FIG. 2 is a perspective view of the lathe unit seen from a diagonally lower front side.

As shown in FIGS. 1 and 2, a lathe unit 10 with a lathe 21 includes an installment base 11. The installment base 11 is installed on a mount surface (not shown), such as a floor surface in a factory. The installment base 11 includes installment members 12 at three positions on a lower surface of the installment base 11. That is, two installment members 12 are located at the front side of the installment base 11, and one installment member 12 is located at the rear side of the installment base 11. The height of each installment member 12 can adjusted by the action of the corresponding inclined cam surface 13. Thus, the height and inclination of the lathe unit 10 is adjusted by adjusting the height of each installment member 12.

As shown in FIGS. 1 and 2, the upper surface of the installment base 11 is provided with two front support legs 15 and one rear support leg 16. The upper end of each of the support legs 15, 16 is provided with a vibration absorber 14, which includes an air damper. The front support legs 15 and the rear support leg 16 are located on a vertical axis (Y-axis) passing through the installment base 11. The lathe 21 is supported on receiving plates 17 at the upper ends of the vibration absorbers 14. Thus, the lathe 21 is supported by the three support legs 15, 16 at three positions.

The structure of the lathe 21 will now be described.

Figure 6:
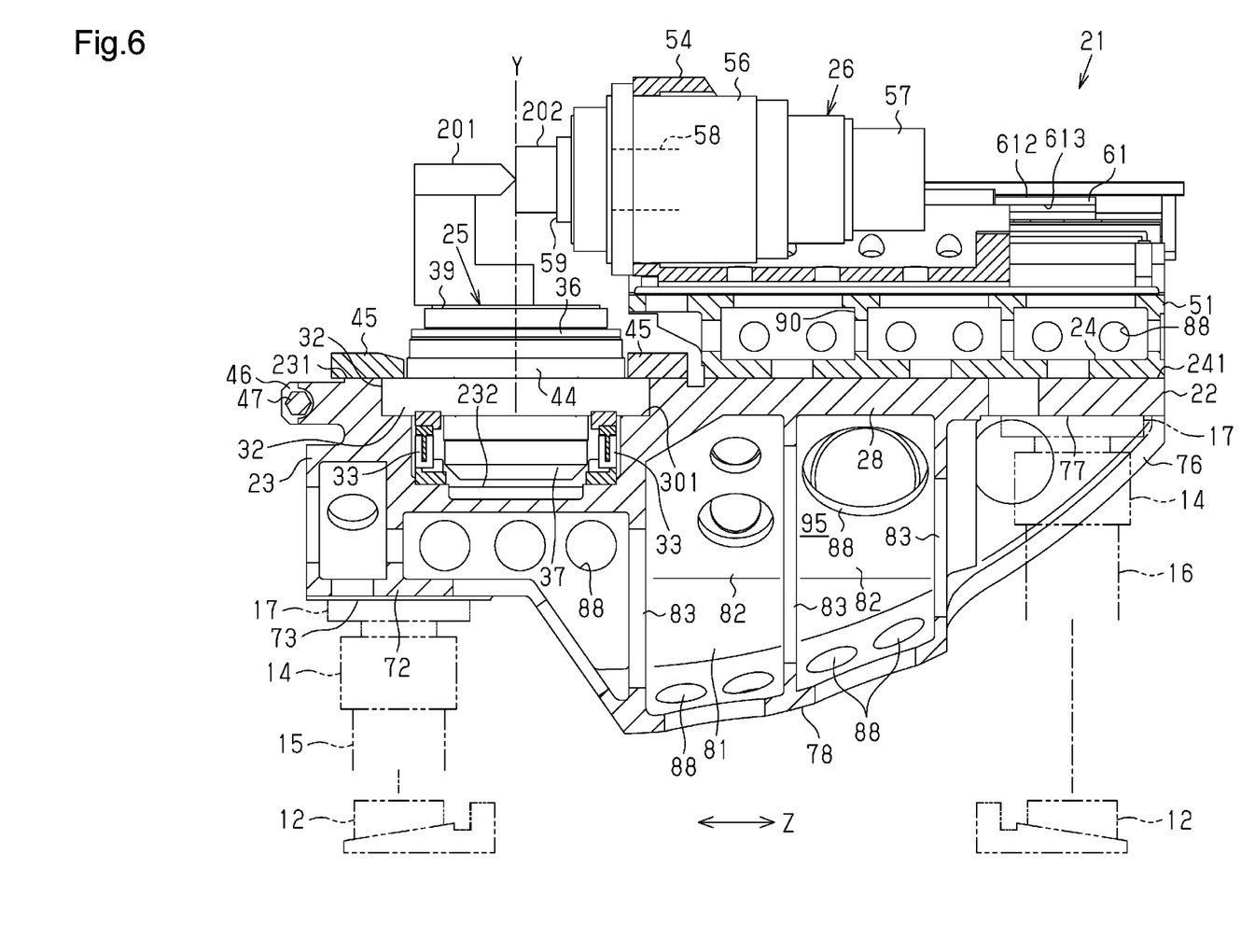
FIG. 6 is a cross-sectional view of the lathe.

As shown in FIGS. 1 and 6, the lathe 21 includes a bed 22. The front part of the bed 22 includes a table support 23. The table support 23 includes a recess 232 that opens on the left and right sides. The rear part of the bed 22 includes a spindle support 24 with a flat top plate 28. The entire bed 22 is formed as an integrated body through casting. As shown in FIG. 6, an upper surface 231 of the table support 23 are located on the same plane as an upper surface 241 of the top plate 28 of the spindle support 24. The left and right opening portions of the recess 232 and the table support 23 are closed by end plates 27, respectively.

As shown in FIGS. 1 and 4 to 6, the table support 23 includes a rotation table unit 25, and the spindle support 24 includes a spindle unit 26.

The rotation table unit 25 has the following structure.

Figure 7:
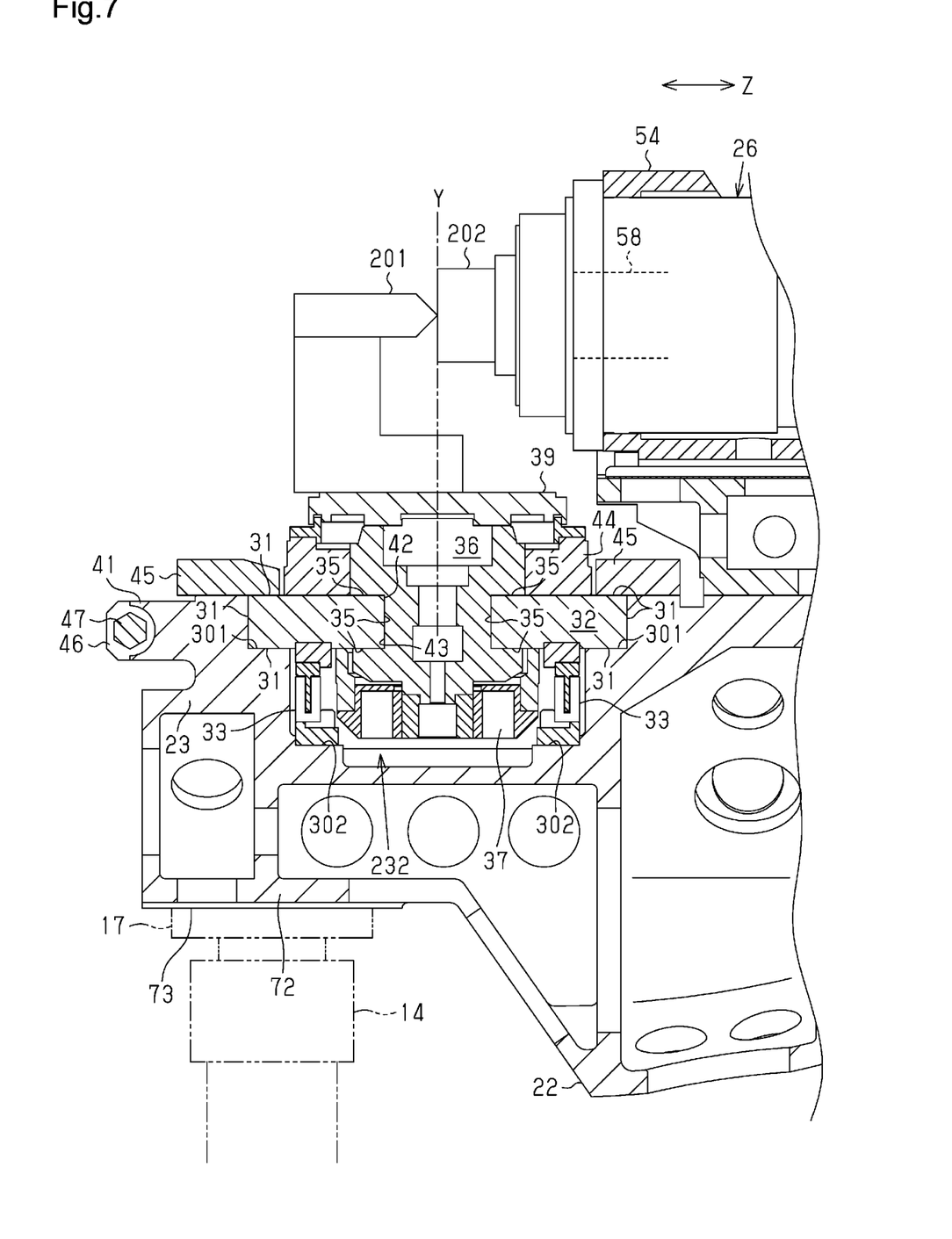
FIG. 7 is a cross-sectional view showing the front part of the lathe.

As shown in FIGS. 6 and 7, an upper step 301 is arranged on each of two surfaces opposing each other in a Z-axis direction on the inner side of the recess 232 of the table support 23. Each upper step 301 is a guiding surface extending in an X-axis direction. The upper steps 301 support a table-side movable body 32 of the rotation table unit 25 such that the table-side movable body 32 is movable in the X-axis direction. That is, the rotation table unit 25 is movable along the X-axis (second axis).

Figure 9:
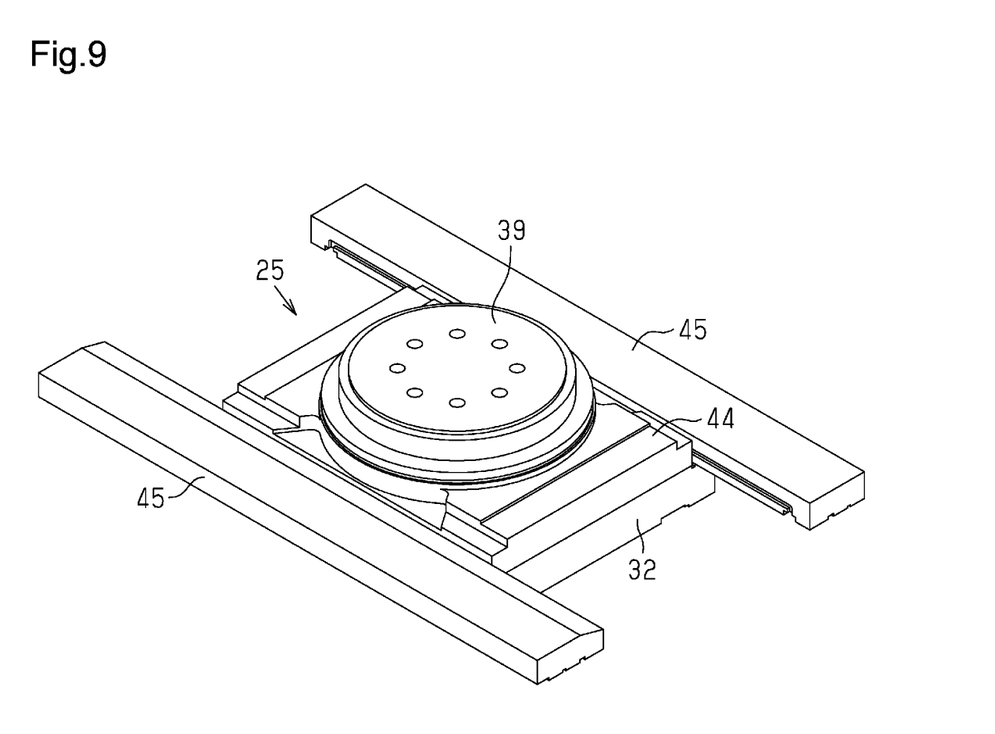
FIG. 9 is a perspective view showing the rotation table unit.
Figure 10:
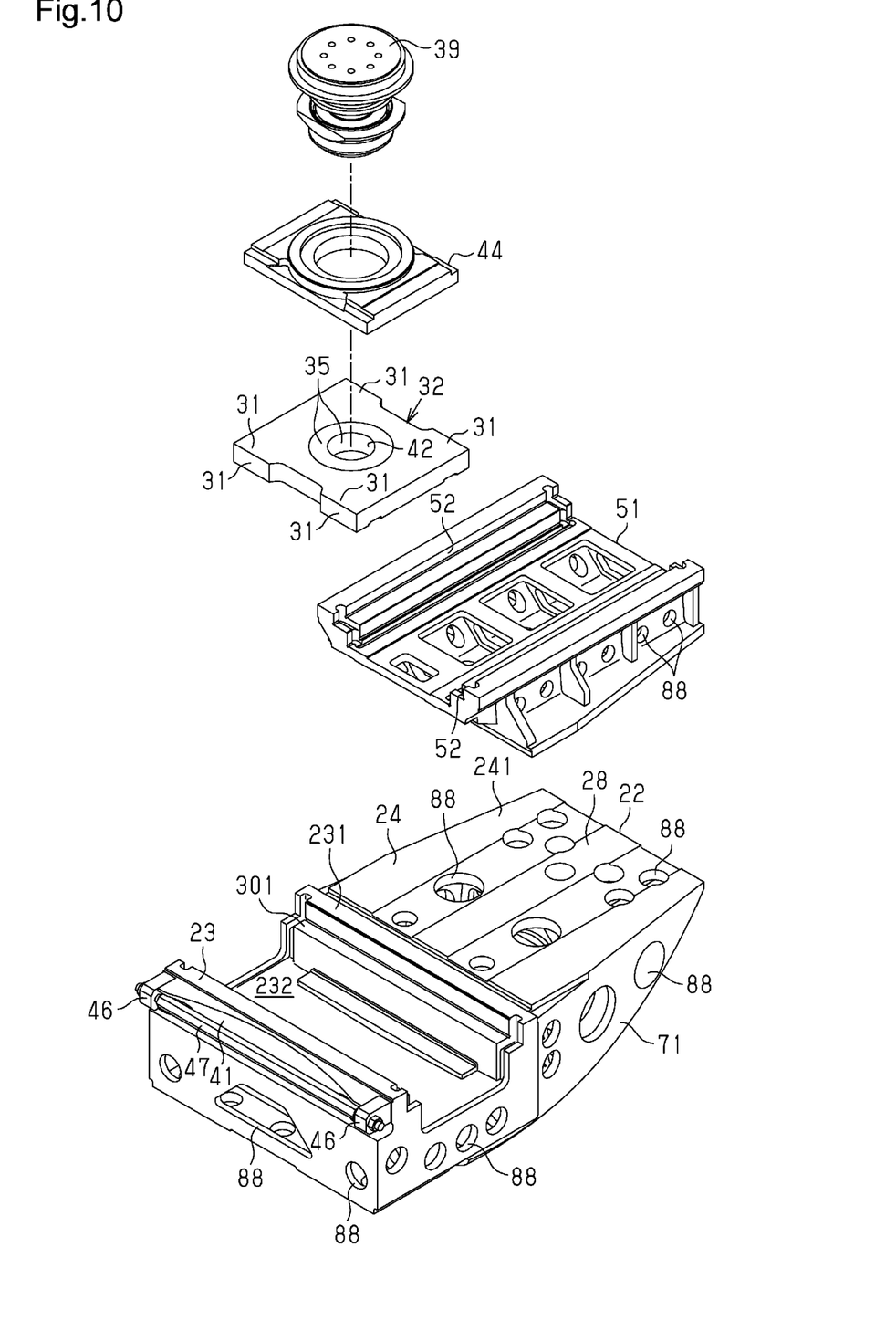
FIG. 10 is an exploded perspective view showing the bed, the unit base, and the rotation table unit.

As shown in FIGS. 7, 9, and 10, the plate-shaped table-side movable body 32 is entirely quadrilateral. The side edges of the table-side movable body 32 extending in the X-axis direction define first oil hydrostatic bearings 31. The first oil hydrostatic bearings 31 each define a guided surface to which oil is supplied. The first oil hydrostatic bearings 31 are arranged on the lower surfaces, side surfaces, and upper surfaces of the side edges of the table-side movable body 32. The first oil hydrostatic bearings 31 on the lower surfaces are supported on the horizontal surfaces of the upper steps 301 by oil films. The first oil hydrostatic bearings 31 on the side surfaces are supported on the vertical surfaces of the upper steps 301 by oil films. Two guide members 45 extending in the X-axis direction are supported on the upper surface of the table support 23. The first oil hydrostatic bearings 31 on the upper surfaces are supported on the lower surfaces of the guide members 45 by oil films. The first oil hydrostatic bearing 31 correspond to linear movement oil hydrostatic bearings. A spacer 44 is attached to the upper surface of the table-side movable body 32. The spacer 44 is located between the table-side movable body 32 and a rotation table 39, which will be described below.

A lower step 302 is defined on the lower side of each upper step 301, and a linear motor 33 is located between each lower step 302 and the table-side movable body 32. That is, a fixed member of each linear motor 33 is fixed to the corresponding lower step 302, and a movable member of each linear motor 33 is coupled to the table-side movable body 32. Driving forces produced by the two linear motors 33 move the table-side movable body 32 in the X-axis direction.

A support hole 42 extends through a central portion of the table-side movable body 32. Second oil hydrostatic bearings 35 are arranged on the wall surface of the support hole 42 and on upper and lower peripheral portions of the support hole 42. The second oil hydrostatic bearings 35 are annular guiding surfaces to which oil is supplied. The second oil hydrostatic bearings 35 support a rotation shaft 36 that includes a rotational axis extending vertically (extending along the Y-axis). The circumferential surface of the rotation shaft 36 includes an annular recess 43. The inner upper surface of the annular recess 43 is supported on the upper surfaces of the second oil hydrostatic bearings 35 by oil films. The inner circumferential surface of the annular recess 43 is supported on the side surfaces of the second oil hydrostatic bearings 35 by oil films. The inner lower surface of the annular recess 43 is supported on the lower surfaces of the second oil hydrostatic bearings 35 by oil films. The second oil hydrostatic bearing 35 correspond to rotation oil hydrostatic bearings.

A rotation motor 37 is arranged at the lower end of the rotation shaft 36. The rotation shaft 36 is rotated by the rotation motor 37 with respect to the axis of the rotation shaft 36.

The first oil hydrostatic bearings 31 are located on the same height as the second oil hydrostatic bearings 35. The rotation motor 37 is located below the first oil hydrostatic bearings 31 and the second oil hydrostatic bearings 35.

The rotation table 39 is attached to the upper end of the rotation shaft 36. A tool such as a tool bit 201 is supported on the rotation table 39. In the present embodiment, the tip of the tool bit 201 is located on the rotational axis (first axis) of the rotation table 39 extending along the Y-axis.

Figure 4:
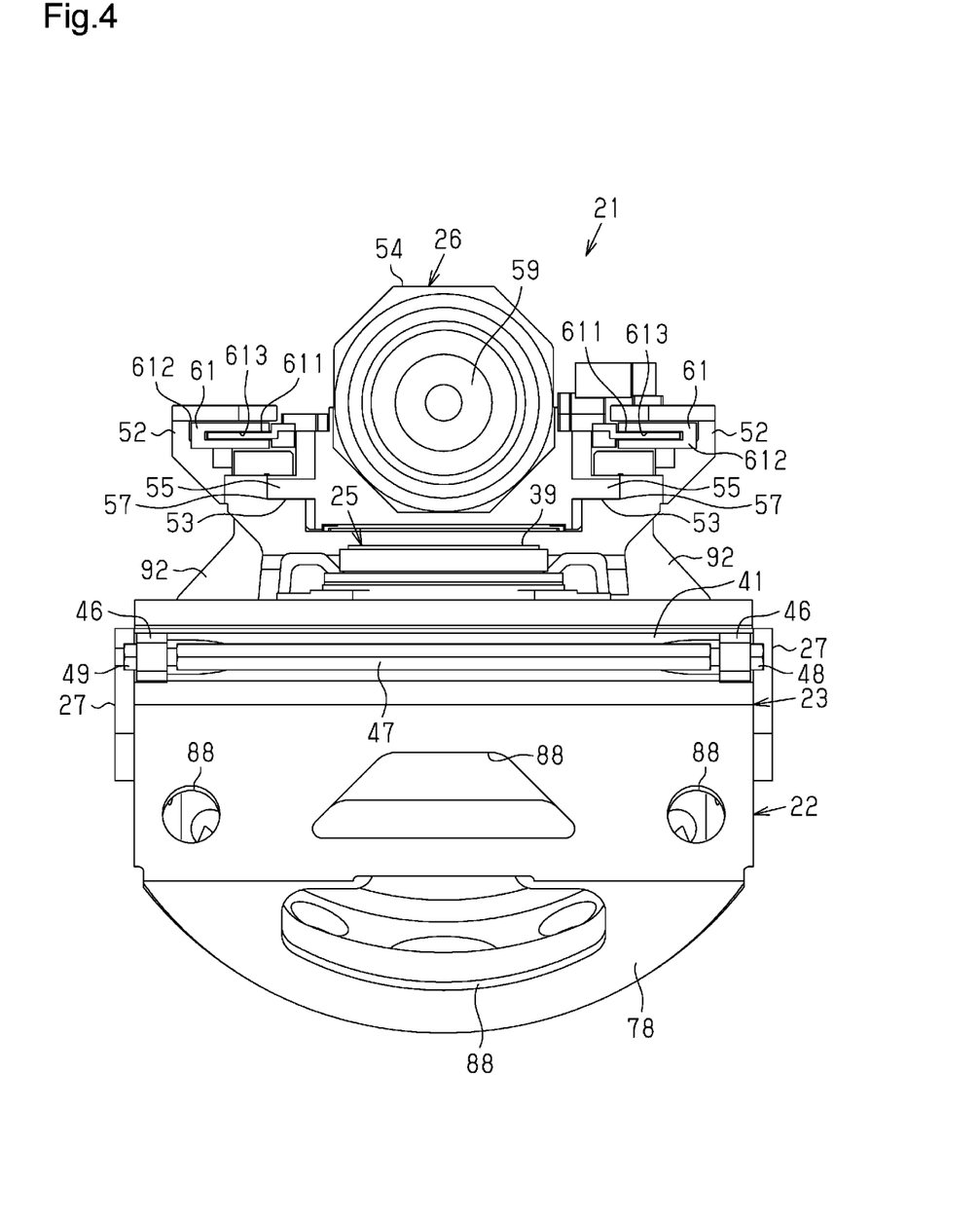
FIG. 4 is a front view of the lathe.

As shown in FIGS. 1, 4, and 7, the front surface of the table support 23 is provided with a deformation adjuster 41 at the same heights as the first oil hydrostatic bearings 31 and the second oil hydrostatic bearings 35. The middle portion of the deformation adjuster 41 is recessed in a gently curved manner. An end member 46 is arranged at each of opposite ends of the deformation adjuster 41. The end members 46 protrude frontward from the deformation adjuster 41. The two end members 46 respectively include threaded holes that extend in reverse spiral directions. External screws at opposite ends of an adjustment rod 47, which has a hexagonal cross-section, are respectively fastened to the threaded holes of the two end members 46. Thus, the adjustment rod 47 functions as a turnbuckle. By rotating the adjustment rod 47, the action of reverse threads finely adjusts the distance between the two end members 46 so that the curvedness of the table support 23 is finely adjusted. As a result, fine adjustment is made for the distance between the vertical surfaces of the two upper steps 301 and for the position in a movement path of the table-side movable body 32. Nuts 48, 49 that resist loosening are fastened to the external screws at the opposite ends of the adjustment rod 47, which respectively protrude from the end members 46.

The spindle unit 26 has the following structure.

Figure 3:
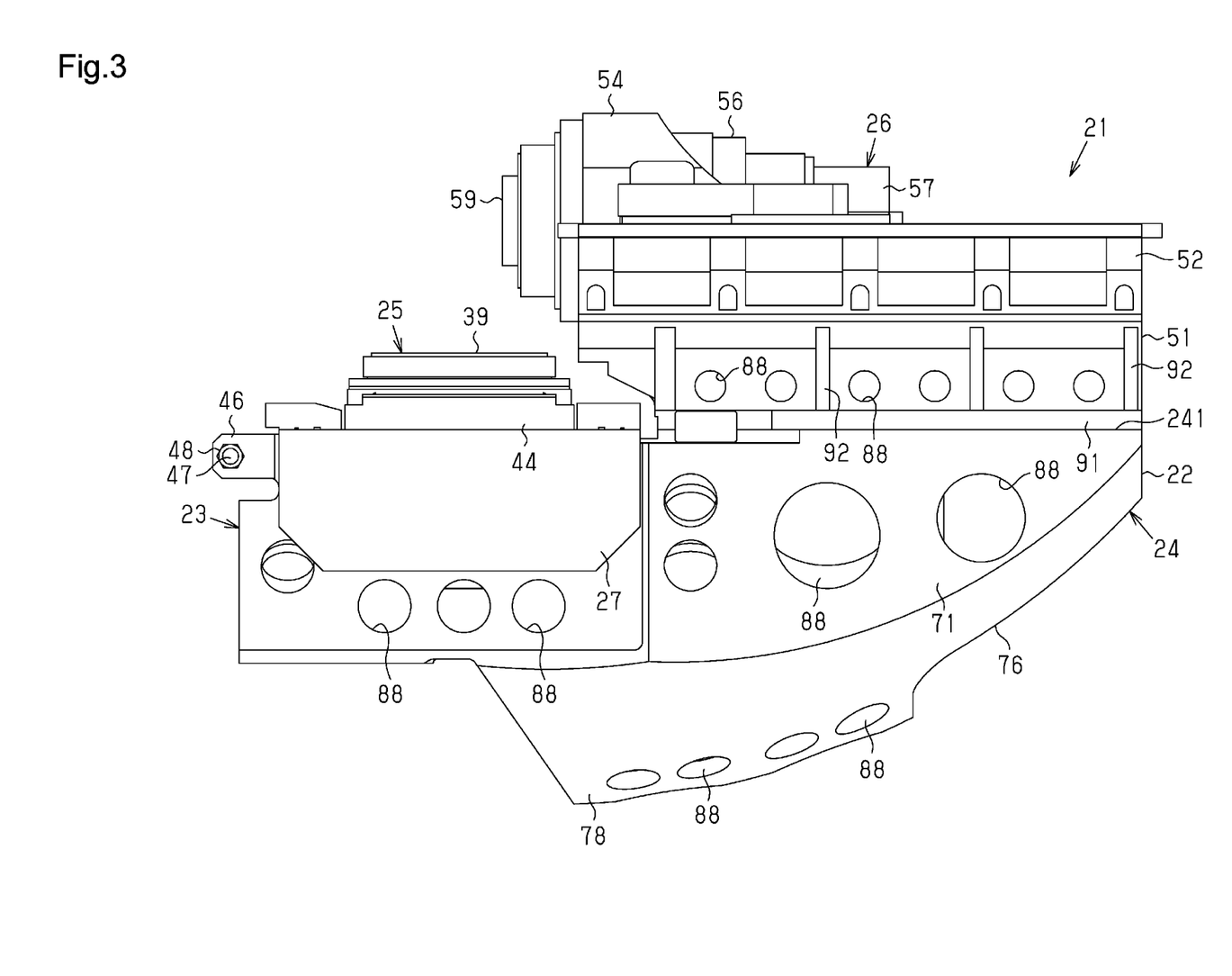
FIG. 3 is a side view of the lathe.
Figure 8:
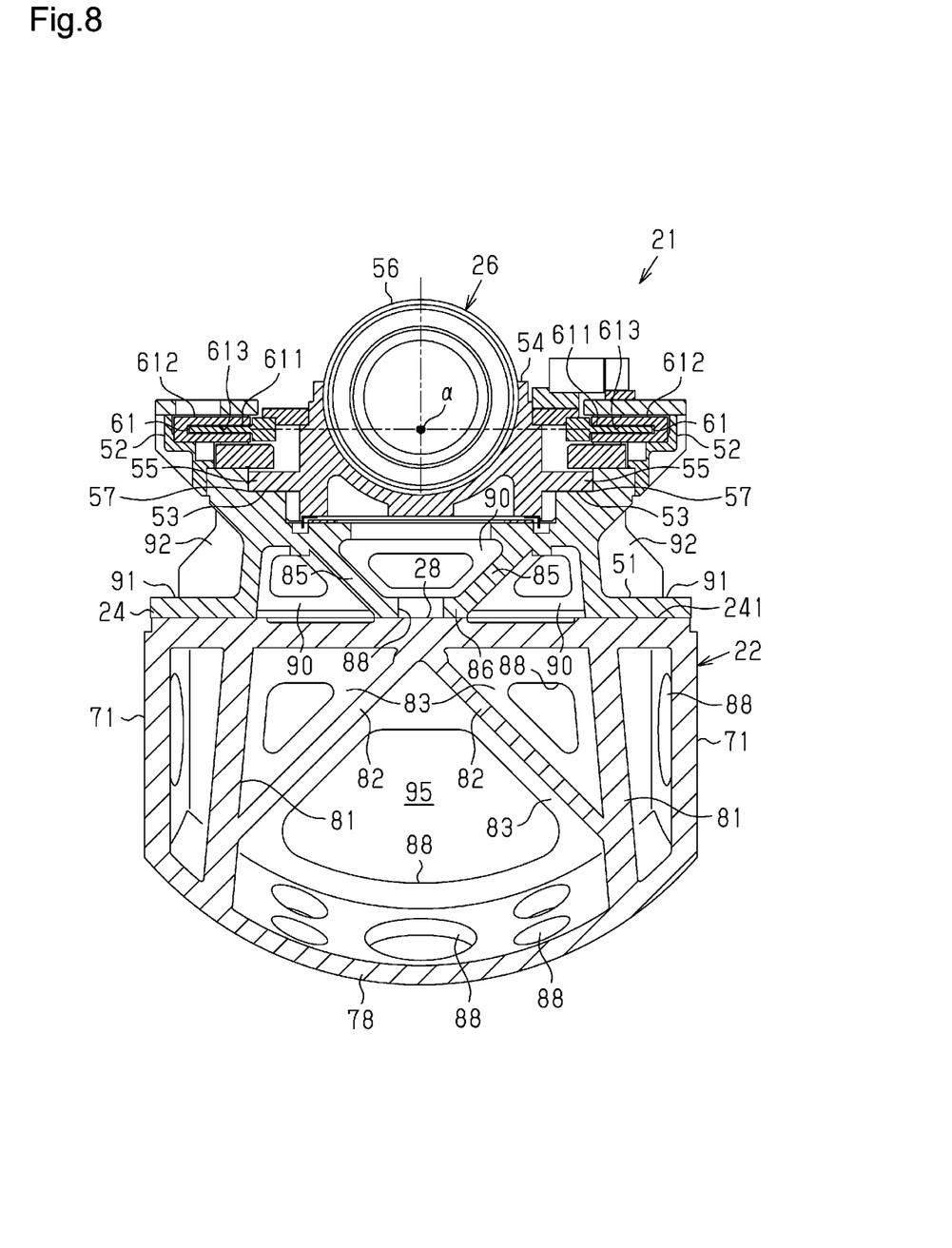
FIG. 8 is a cross-sectional view of the lathe taken along a direction that is orthogonal to FIG. 6.

As shown in FIGS. 1, 3, and 10, a unit base 51 is mounted on and fixed to the upper surface of the spindle support 24, and receiving members 52 are integrally arranged on opposite sides of the unit base 51. As shown in FIGS. 6 and 8, sliders 55 on opposite sides of a spindle-side movable body 54 are respectively supported on the two receiving members 52 by third oil hydrostatic bearings 53 such that the sliders 55 are movable in the Z-axis direction. That is, the lower surface and the side surface (vertical surface) of each slider 55 defines the third oil hydrostatic bearing 53, to which oil is supplied. The upward surface and the side surface (vertical surface) of each receiving member 52 support the corresponding third oil hydrostatic bearing 53 by an oil film and guide movement of the spindle-side movable body 54 in the Z-axis direction.

The spindle-side movable body 54 is made of a metal ceramic composite material. For reduction in weight and toughness, the metal ceramic composite material is obtained by, for example, dispersing powders in an iron cast. The spindle-side movable body 54 supports a spindle bearing 56.

The spindle-side movable body 54 is moved in the Z-axis direction by linear motors 61 on opposite sides of the spindle-side movable body 54. The linear motors 61 extend along the Z-axis. The linear motors 61 each include a fixed member 612, which includes a permanent magnet (not shown), and a movable member 611, which includes a flat coil (not shown). The fixed members 612 are joined to the unit base 51, and the movable members 611 are joined to the spindle-side movable body 54. That is, the fixed member 612 is indirectly fixed to the bed 22, and the movable member 611 is fixed to the spindle unit. The movable member 611 is located in a slit 613 of the fixed member 612. A configuration may be employed in which the fixed member 612 includes a flat coil and the movable member 611 includes a permanent magnet. Alternatively, the two members 612, 611 may each include a flat coil.

As shown in FIGS. 6 and 7, the spindle bearing 56 supports a spindle 58 that is rotated by a rotation motor 57. The spindle 58 includes a rotational axis (third axis) extending along the Z-axis. The tip of the spindle 58 includes an air chuck 59. A workpiece 202 is secured to the tip of the air chuck 59.

As shown in FIG. 8, the center of gravity a of the spindle unit 26 is located in a direction corresponding to the Y-axis (vertical direction) in a range of the vertical width of the slit 613 of each linear motor 61. In the present embodiment, the center of gravity a is located at the middle in the range of the thickness of the movable member 611 of the slit 613. That is, the center of gravity a is located at the same height as the slit 613 or the movable member 611.

The bed 22, the unit base 51, and the components related to the bed 22 and the unit base 51 will now be described in detail.

As shown in FIGS. 3 and 7, the front end of the unit base 51 is located above the table support 23.

Figure 5:
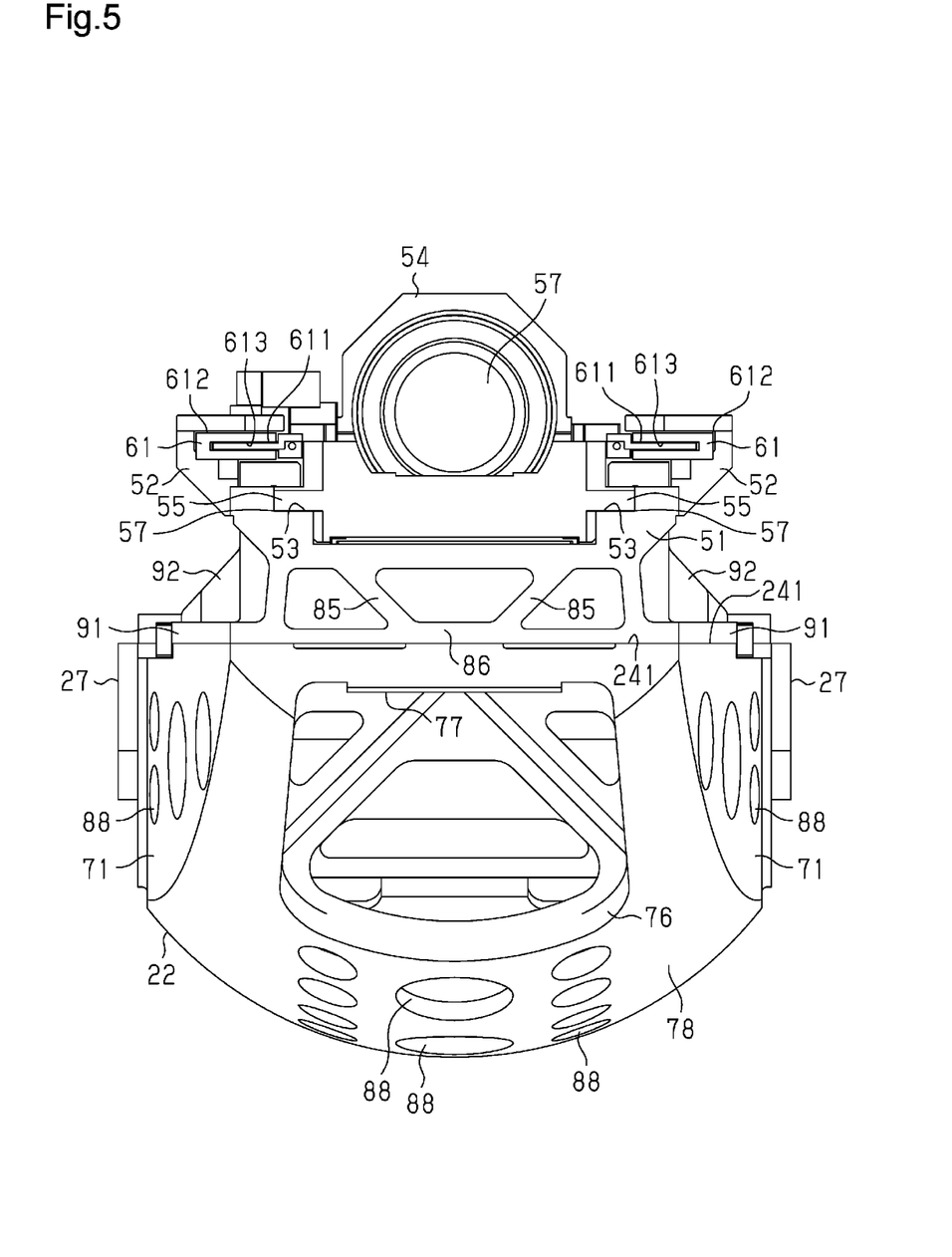
FIG. 5 is a rear view of the lathe.

As shown in FIGS. 5, 6, and 8, a vertically-extending side plate 71 is arranged integrally with each of the left and right ends of the bed 22. A front lower plate 72 extends between the lower ends of the two side plates 71 below the table support 23. The front lower plate 72 is arranged integrally with the two side plates 71. A rear lower plate 78 (corresponding to a bulged portion) extends between the lower ends of the two side plates 71 below the spindle support 24. The rear lower plate 78 is arranged integrally with the two side plates 71.

As shown in FIGS. 2 and 6, a front leg coupling portion 73 (corresponding to a first load receiving portion) is arranged at each of the left and right ends on the lower surface of the front lower plate 72. That is, the front leg coupling portions 73 are respectively arranged at the opposite ends on the lower surface of the front lower plate 72 in a movement direction of the rotation table 39 corresponding to the X-axis. The front leg coupling portions 73 are respectively mounted on the receiving plates 17, which are located at the upper ends of the support legs 15, and coupled to the receiving plates 17 by bolts (not shown). The rear end of the rear lower plate 78 includes a through portion 76. The through portion 76 opposes a rear leg coupling portion 77 (corresponding to a second load receiving portion) on the lower surface of the top plate 28 of the spindle support 24. The rear leg coupling portion 77 is located below the spindle 58; specifically, below the rotational axis of the spindle 58. More specifically, the rear leg coupling portion 77 is located in a region where the spindle bearing 56 moves and at a position corresponding to a middle position between the left and right third oil hydrostatic bearings 53. The rear leg coupling portion 77 is mounted on the receiving plates 17, which are located at the upper end of the rear support leg 16, and coupled to the receiving plate 17 by a bolt (not shown). The rear leg coupling portion 77 is located above the front leg coupling portions 73.

Accordingly, the lathe 21 is supported by the front support legs 15 at two positions located at the same height in the X-axis direction and supported by the rear support leg 16 at one position extending through the middle of the two front support legs 15 in the Z-axis direction. The lathe 21 is supported in the front-rear direction (Z-axis direction) with a height difference such that the lathe 21 is supported at a higher position on the rear side than on the front side. In other words, the point at which the rear support leg 16 supports the lathe 21 is higher than the points at which the front support legs 15 support the lathe 21.

As shown in FIGS. 6 to 8, the rear lower plate 78 is located between the front leg coupling portion 73 and the rear leg coupling portion 77. The rear lower plate 78 has a curved or spherical shape that bulges in a substantially arcuate manner in the front-rear direction and the left-right direction.

As shown in FIGS. 6 and 8, the bed 22 includes a cavity 95 surrounded by the top plate 28, the side plates 71, and the rear lower plate 78. The bed 22 includes reinforcement walls 81, 82, 83. The reinforcement walls 81, 82, 83 include two reinforcement vertical walls 81, two reinforcement inclined walls 82, and multiple reinforcement horizontal walls 83. The reinforcement vertical walls 81 extend between the top plate 28 and the rear lower plate 78. The reinforcement inclined walls 82 extend between the top plate 28 and lower end regions of the two reinforcement vertical walls 81. The reinforcement horizontal walls 83 extend, for example, between the top plate 28 and the reinforcement inclined walls 82, between the reinforcement inclined walls 82 and the rear lower plate 78, and between the reinforcement vertical walls 81 and the side plates 71. The lower surface of the unit base 51 includes a reinforcement defined by two inclined walls 85 and a bridge 86 that extends between the lower ends of the two inclined walls 85. The bridge 86 is in contact with the upper surface of the top plate 28. The unit base 51 includes horizontal walls 90. The lower portions of the unit base 51 on opposite sides each include a plate 91 that extends sideward. Reinforcement ribs 92 are arranged between the plates 91 and the side wall of the unit base 51. The reinforcement ribs 92 are arranged integrally with the unit base 51.

As shown in FIGS. 1, 6, and 8, through-holes 88 are arranged for weight reduction. The shapes of through-holes 88 are, for example, circular or triangular.

The operation of the lathe 21 will now be described.

For example, machining the front surface of the workpiece 202 into a projected curved surface or a recessed curved surface rotates the spindle 58 and the air chuck 59, which is used to secure the workpiece 202. Further, the linear motors 61 work so as to move the spindle unit 26 in the Z-axis direction. Simultaneously, the rotation table 39 is turned with respect to the Y-axis while the rotation table unit 25 is moved back and forth in the X-axis direction. Accordingly, while the tip of the tool bit 201 is rotated with respect to the Y-axis, the tool bit 201 is moved back and forth in the X-axis direction and the workpiece 202 is moved back and forth in the Z-axis direction. In this manner, the workpiece 202 is cut into a projected curved surface or a recessed curved surface. Thus, the workpiece 202 is machined into various shapes by setting the speed, timing, stroke, and the like of the movement of the spindle unit 26 in the Z-axis direction and the movement of the rotation table unit 25 in the X-axis direction and by setting the rotation speed, the rotation range, and the like of the rotation table 39.

The above-described embodiment provides the following advantages.

(1) The table support 23 at the front part of the bed 22 includes the recess 232. The recess 232 accommodates the rotation table unit 25. This lowers the position of the rotation table 39. The rotation table unit 25 includes the plate-shaped movable body 32. The outer portion of the movable body 32 defines the first oil hydrostatic bearings 31. Further, the movable body 32 includes the second oil hydrostatic bearings 35 defined by the wall surface of the support hole 42 and the peripheral portions of the support hole 42. The first oil hydrostatic bearings 31 is located at the same height as the second oil hydrostatic bearings 35. This reduces the vertical dimension of the rotation table unit 25. As a result, the height of the rotation table 39 is further reduced. This lowers the position of the tool bit 201 on the rotation table 39 and thus lowers the position of the spindle 58 supporting the workpiece 202. Accordingly, the entire lathe 21 is reduced in thickness, size, and weight. This increases the natural frequency of the lathe 21 and reduces the amplitude of the vibration, thereby improving the machining accuracy. In addition, since the lathe 21 is reduced in size and weight, the lathe 21 is installed in a factory with fewer conditions and thus easily handled.

(2) The spindle unit 26 includes the spindle 58 that is rotated with respect to the horizontal Z-axis. Further, the spindle unit 26 is moved in the direction of the Z-axis by the third oil hydrostatic bearings 53. The linear motors 61 are arranged on opposite sides of the spindle unit 26, respectively. The linear motors 61 work so as to move the spindle unit 26 along the Z-axis. This produces a driving force on each of the opposite sides of the spindle unit 26 and thus reduces the offset load on the spindle unit 26. Accordingly, the spindle unit 26 is moved in the Z-axis smoothly and accurately without being inclined by pitching or rolling. As a result, the machining accuracy is improved.

(3) The center of gravity a of the spindle unit 26 is set to be in the range of the thickness of the movable member 611 of each linear motor 61 in the up-down direction. Thus, when the spindle unit 26 is moved in the Z-axis direction, offset load hardly acts on the spindle unit 26. Accordingly, the spindle unit 26 is moved in the Z-axis smoothly and accurately with almost no inclination of the spindle unit 26. As a result, the machining accuracy is improved.

(4) The third oil hydrostatic bearings 53 of the spindle unit 26 are located below the linear motors 61. Thus, the weight of the spindle unit 26 is received at the lower parts of the linear motors 61. This limits the action of offset load on the linear motors 61.

(5) The spindle-side movable body 54 is made of a metal ceramic composite material and thus reduced in size. This reduces the driving force needed to move the spindle unit 26 and allows for the use of a small linear motor 61 with a small power consumption. Further, the reduction in the weight of the entire spindle unit 26 lowers the inertial load that is produced when the spindle unit 26 is started and stopped. This limits the inclination of the spindle unit 26 that occurs when the spindle unit 26 is started and stopped. As a result, the machining accuracy is improved. Furthermore, the reduction in the weight of the spindle unit 26 lowers the amplitude of the spindle unit 26 that occurs when the spindle unit 26 vibrates. This also improves the machining accuracy.

(6) The linear motors 61 that move the spindle unit 26 are located at opposite sides of the spindle unit 26. Thus, as compared with a configuration in which linear motors and a lead screw are located below a spindle unit, the total height of the spindle unit 26 is reduced. Accordingly, the entire lathe is reduced in size.

(7) Since the total height of the spindle unit 26 is reduced, the spindle unit 26 can be easily located on the upper side of the rotation table 39 without increasing the total height of the machine tool so much. Thus, the front end of the unit base 51 is extended frontward to form an overhang. As a result, the forward end of the spindle unit 26 approaches the rotation table 39. This reduces the machining area of the machine tool and improves the degree of freedom in various types of machining, thereby increasing the versatility of the lathe.

(8) The lathe 21 is supported at three positions. This allows the support legs 15, 16 to stably support the lathe 21. Accordingly, the present embodiment maintains a state capable of performing highly accurate machining.

(9) Level difference is provided for the positions of the front support legs 15 and the rear support leg 16 that support the bottom of the bed 22 of the lathe 21. More specifically, the position of the rear support leg 16 supporting the bottom of the bed 22 is higher than the positions of the front support legs 15 supporting the bottom of the bed 22. This brings the position of a mounting base of the rear support leg 16 close to the center of gravity of the bed 22. Thus, as compared with a case in which no height difference is provided for front and rear support positions, the vibration of the bed 22 caused by the movement of the spindle unit 26 is limited. This avoids a decrease in the machining accuracy.

(10) The rear lower plate 78 located below the spindle support 24 of the bed 22 has a curved shape that rises rearward. Thus, unlike a case in which the rear lower plate 78 extends straight in a horizontal manner, the bed 22 is reduced in size. Further, the cavity 95 is located below the spindle support 24 of the bed 22. This reduces the size of the bed 22. As a result, the amplitude of the natural vibration of the lathe 21 is reduced.

(11) Although the cavity 95 is located below the spindle support 24 of the bed 22, the cavity 95 includes the reinforcement walls 81, 82, 83 and the like. This maintains the rigidity of the bed 22. Also, the rear lower plate 78 is curved into a spherical shape. This further improves the rigidity of the bed 22.

(12) The load produced by the spindle unit 26 and the like acts on the rear lower plate 78 as a tensile load. However, the rear lower plate 78 has an arcuate shape in the front-rear direction and thus effectively resists the tensile load, thereby properly limiting the deformation of the bed 22 that would be caused by the tensile load. Further, the load produced by the weights of the linear motors 33 and the like on opposite sides of the spindle 58 acts on the rear lower plate 78 as a compressive load. However, the rear lower plate 78 has an arcuate shape in the left-right direction and thus effectively resists the compressive load, thereby properly limiting the deformation of the bed 22 that would be caused by the compressive load. Accordingly, the substantial rigidity of the bed 22 improves without an increase in weight of the bed 22. This contributes to high-accuracy machining.

(13) The rear leg coupling portion 77 receiving the rear support leg 16 is located higher than the front leg coupling portions 73 receiving the front support legs 15. Thus, the shape of the lower part of the bed 22 rises rearward. This contributes to reduction of the bed 22 in size and weight as described above.

(14) Since the plate-shaped portion of the bed 22 includes the through-holes 88, the weight of the entire lathe 21 is reduced. Further, when the through-holes 88 function as air vents, the temperatures inside and outside of the lathe 21 become uniform. This limits distortion and deformation of the bed 22 and the like.

Modifications

The present embodiment may be modified as follows. The present embodiment and the following modifications can be combined as long as the combined modifications remain technically consistent with each other.

The center of gravity a of the spindle unit 26 may be set in a range of the thickness of each linear motor 61 in the up-down direction. Even such a configuration provides almost the same advantages as those of the above-described embodiment.

Unlike the above-described embodiment, the spindle support 24 may support a tool such as a rotation grindstone and the rotation table 39 may support a workpiece.

The present embodiment may be applied to a machine tool other than a lathe. For example, a spindle may support a tool such as a drill and a rotation table may support a workpiece.

The bed 22 and the unit base 51 may be integrally arranged.

The oil hydrostatic bearing in each member may be changed to another type of bearing, such as a rolling bearing or an air bearing.

Several Technical Ideas in Present Disclosure (A) A machine tool including:
a bed;
a table unit arranged on an upper surface of the bed; and
a spindle unit including a spindle configured to rotate with respect to a rotational axis, the spindle unit being arranged on the upper surface of the bed, where
a lower surface of the bed including two first load receiving portions and one second load receiving portion, the first load receiving portions being arranged in a direction that is orthogonal to the rotational axis, and the second load receiving portion being located at a portion corresponding to the rotational axis, and
the lower surface of the bed includes a bulged portion between the first load receiving portions and the second load receiving portion, the bulged portion having a curved shape.

(B) The machine tool according to technical idea (A), where
the table unit is configured to move in the direction that is orthogonal to the rotational axis, and
the first load receiving portions are located in correspondence with opposite ends of a movement range of the table unit.

(C) The machine tool according to technical idea (A) or (B), where
the bed is configured to support the spindle unit at a higher position than the table unit, and the second load receiving portion is located at a higher position than the first load receiving portions.

(D) The machine tool according to any one of technical ideas (A) to (C), further including a linear motor configured to move the spindle unit along the rotational axis, where
the spindle unit includes a motor and a movable body, the motor being configured to rotate the spindle, and the movable body supporting the spindle and the motor, and
the linear motor includes a movable member arranged on the movable body.

The invention claimed is:

1. A machine tool, comprising:
a rotation table unit including a rotation table configured to rotate with respect to a first axis, the rotation table unit being configured to move along a second axis that is orthogonal to the first axis;
a spindle unit including a spindle configured to rotate with respect to a third axis that is orthogonal to the first axis and the second axis, the spindle unit being configured to move along the third axis;
a bed that supports the rotation table unit and the spindle unit;
a rotation oil hydrostatic bearing that supports the rotation table such that the rotation table is rotatable with respect to the first axis; and
a linear movement oil hydrostatic bearing that supports the rotation table unit such that the rotation table unit is movable along the second axis, wherein
a front part of an upper surface of the bed includes a recess in which the rotation table unit is arranged,
the spindle unit is located at a rear part of the upper surface of the bed, and
the rotation oil hydrostatic bearing is located on a same height as the linear movement oil hydrostatic bearing.

2. The machine tool according to claim 1, wherein the rotation table unit includes a movable body having the linear movement oil hydrostatic bearing and the rotation oil hydrostatic bearing.

3. The machine tool according to claim 2, wherein
the movable body has a plate shape,
the linear movement oil hydrostatic bearing is arranged at each of side edges of the movable body, and
the rotation oil hydrostatic bearing is arranged at a central portion of the movable body.

4. The machine tool according to claim 1, wherein
a lower surface of the bed includes two first load receiving portions and one second load receiving portion, the first load receiving portions being arranged in a direction corresponding to the second axis, and the second load receiving portion being located at a position corresponding to the third axis, and
the lower surface of the bed includes a bulged portion between the first load receiving portions and the second load receiving portion, the bulged portion having a curved shape.

5. The machine tool according to claim 4, wherein the bed includes a cavity in which a reinforcement wall is arranged.

6. The machine tool according to claim 1, further comprising an oil hydrostatic bearing that supports the spindle unit such that the spindle unit is movable along the third axis.

7. The machine tool according to claim 1, further comprising linear motors respectively arranged on opposite sides of the spindle unit, wherein the linear motors are configured to move the spindle unit along the third axis.

8. The machine tool according to claim 7, further comprising an oil hydrostatic bearing that supports the spindle unit such that the spindle unit is movable along the third axis.

9. The machine tool according to claim 8, wherein the oil hydrostatic bearing is located below the linear motors.

10. The machine tool according to claim 7, wherein a center of gravity of the spindle unit is located in a range of a thickness of each of the linear motors in an up-down direction of the linear motors.

11. The machine tool according to claim 7, wherein
the linear motors each include a fixed member fixed to the bed and a movable member fixed to the spindle unit, and
a center of gravity of the spindle unit is located in a range of a thickness of each of the movable members in an up-down direction of the movable members.

12. The machine tool according to claim 11, wherein
the spindle unit includes a motor and a movable body, the motor being configured to rotate the spindle, and the movable body supporting the spindle and the motor, and
the movable body includes the movable member.

13. The machine tool according to claim 12, wherein the movable body is made of a metal ceramic composite material.

14. A machine tool, comprising:
a spindle unit including a spindle configured to rotate with respect to a horizontal axis, the spindle unit being configured to move along the horizontal axis; and
linear motors respectively arranged on opposite sides of the spindle unit, the linear motors being configured to move the spindle unit along the horizontal axis,
wherein a center of gravity of the spindle unit is located in a range of a thickness of each of the linear motors in an up-down direction of the linear motors.

15. A machine tool, comprising:
a rotation table unit including a rotation table configured to rotate with respect to a first axis, the rotation table unit being configured to move along a second axis that is orthogonal to the first axis;
a spindle unit including a spindle configured to rotate with respect to a third axis that is orthogonal to the first axis and the second axis, the spindle unit being configured to move along the third axis; and
linear motors respectively arranged on opposite sides of the spindle unit, the linear motors being configured to move the spindle unit along the third axis,
wherein a center of gravity of the spindle unit is located in a range of a thickness of each of the linear motors in an up-down direction of the linear motors.

* * * * *